(12) United States Patent
Kuwano

(10) Patent No.: US 11,565,554 B2
(45) Date of Patent: Jan. 31, 2023

(54) PNEUMATIC TIRE WITH SPECIFIED RIM PROTECTOR

(71) Applicant: Toyo Tire Corporation, Itami (JP)

(72) Inventor: Shingo Kuwano, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 373 days.

(21) Appl. No.: 16/703,108

(22) Filed: Dec. 4, 2019

(65) Prior Publication Data

US 2020/0180364 A1    Jun. 11, 2020

(30) Foreign Application Priority Data

Dec. 7, 2018   (JP) .............................. JP2018-229550

(51) Int. Cl.
  *B60C 13/02*   (2006.01)
  *B60C 15/024*  (2006.01)
  *B29D 30/06*   (2006.01)
  *B29D 30/72*   (2006.01)

(52) U.S. Cl.
  CPC .......... *B60C 13/02* (2013.01); *B29D 30/0606* (2013.01); *B29D 30/72* (2013.01); *B60C 15/0242* (2013.01); *B29D 2030/0612* (2013.01)

(58) Field of Classification Search
  CPC ... B60C 13/02; B60C 15/0242; B60C 13/002; B60C 13/00; B60C 15/024; B60C 15/02; B60C 15/00
  USPC .......................... 152/523, 544; D12/605, 501
  See application file for complete search history.

(56) References Cited

U.S. PATENT DOCUMENTS

| | | | |
|---|---|---|---|
| 6,913,051 B2 * | 7/2005 | Auxerre | ................ B60C 15/024 |
| 10,259,265 B2 * | 4/2019 | Iwamura | |
| D864,851 S * | 10/2019 | Kuwano | ...................... D12/605 |
| 2001/0048182 A1 * | 12/2001 | Caretta | |
| 2016/0318353 A1 * | 11/2016 | Byrne | |

FOREIGN PATENT DOCUMENTS

| | | |
|---|---|---|
| JP | 08258518 A * | 10/1996 |
| JP | H10-34766 A | 2/1998 |
| JP | 2002-59712 A | 2/2002 |

(Continued)

OTHER PUBLICATIONS

English machine translation of JP 8-258518 A, Oct. 8, 1996.*

(Continued)

*Primary Examiner* — Adrienne C. Johnstone
(74) *Attorney, Agent, or Firm* — WHDA, LLP

(57) ABSTRACT

A tire has a rim protector has a first protruding edge which extends in the tire circumferential direction, a second protruding edge which extends in the tire circumferential direction, a plurality of recesses, and a plurality of ridges. The plurality of ridges respectively connect the first protruding edge and the second protruding edge. Each of the plurality of ridges includes a first ridge that extends from the first protruding edge so as to be directed in a first direction in the tire circumferential direction to reach the second protruding edge, and a second ridge that extends from the second protruding edge so as to be directed in the first direction to reach the first protruding edge. The first ridges and the second ridges are arranged in alternating fashion along the tire circumferential direction.

9 Claims, 12 Drawing Sheets

(56) References Cited

FOREIGN PATENT DOCUMENTS

| JP | 2003-112505 A | 4/2003 |
|---|---|---|
| JP | 2007-62484 A | 3/2007 |
| JP | 2008-273084 A | 11/2008 |
| JP | 2013-107451 A | 6/2013 |

OTHER PUBLICATIONS

Online definition of "sprue" from American Heritage Dictionary of the English Language, 5th ed., Houghton Mifflin Harcourt Publishing Company, 2016.*
Online definition of "sprue" from Collins English Dictionary—Complete and Unabridged, 12th ed., HarperCollins Publishers, 2014.*
Online definition of "ridge", American Heritage Dictionary of the English Language, 5th ed., Houghton Mifflin Harcourt Publishing Company, 2016.*
Online definition of "ridge", Collins English Dictionary—Complete and Unabridged, 12th ed., HarperCollins Publishers, 2014.*
Office Action dated Aug. 12, 2022, issued in JP Application No. 2018-231376 (counterpart to US application No. 16/704,474), with English Translation. (4 pages).
Office Action dated Sep. 1, 2022, issued in counterpart JP Application No. 2018-229550, with English Translation. (8 pages).
Office Action dated Nov. 2, 2022, issued in counterpart CN Application No. 201910925311.1, with English Translation. (18 pages).

* cited by examiner

FIG. 2A
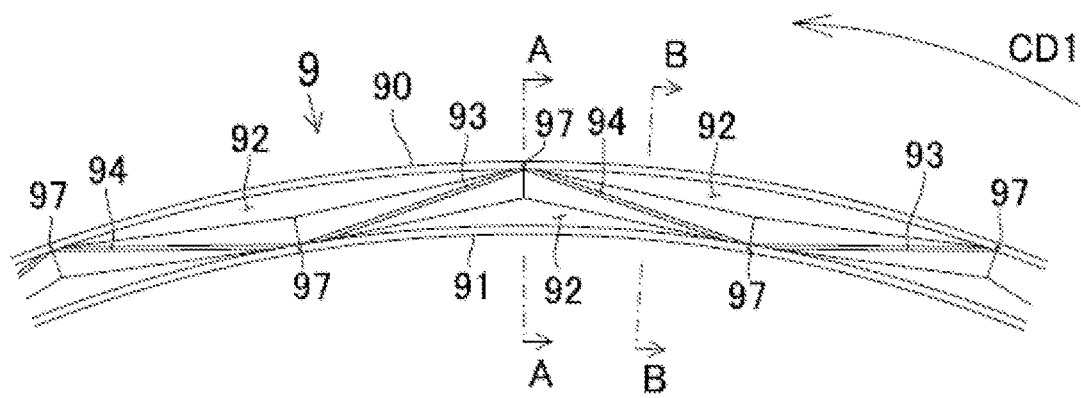
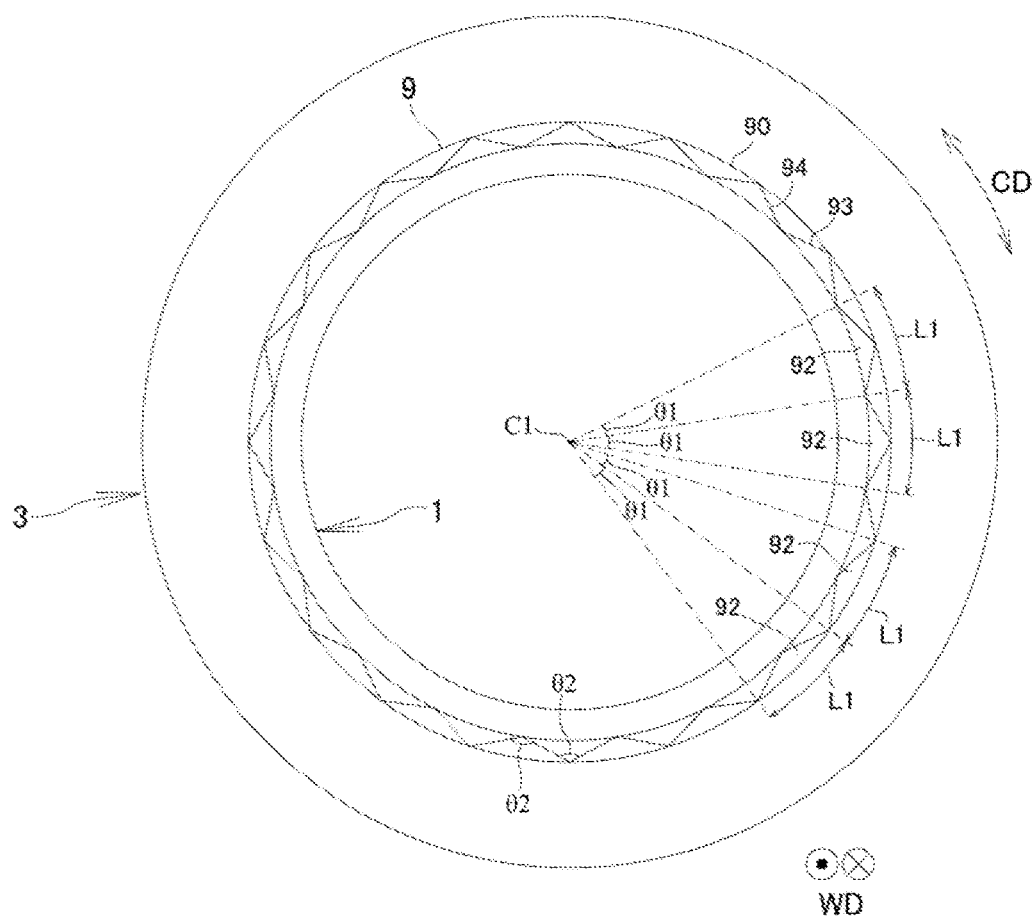
FIG. 2B

A-A

A-A

B-B

C-C

D-D

PNEUMATIC TIRE WITH SPECIFIED RIM PROTECTOR

BACKGROUND OF THE INVENTION

Field of the Invention

The present disclosure relates to a pneumatic tire and to a tire vulcanizing die.

Description of the Related Art

A pneumatic tire has a tread and beads, and has sidewalls arranged between the tread and the beads. There are pneumatic tires in which a rim protector is formed along the entire circumference at a portion of the sidewall that is located toward the exterior in the tire radial direction from the region contacted by the rim flange. It is often the case that the cross-sectional shape of the rim protector is trapezoidal or triangular, being the same everywhere along the entire circumference of the sidewall.

Japanese Patent Application Publication Kokai No. 2002-59712 discloses that provision of a recess at the rim protector reduces the thickness of the rim protector and suppresses generation of heat, and that the recess also causes increase in surface area and improvement in heat dissipation characteristics.

However, provision of a recess at the rim protector increases the tendency of the rim protector to flex in the tire radial direction, decreasing rigidity.

SUMMARY OF THE INVENTION

It is an object of the present disclosure to provide a pneumatic tire and a tire vulcanizing die that will make it possible to simultaneously achieve reduction in failure due to heat and suppression of any decrease in rigidity that might otherwise have occurred.

According of the present disclosure, there is provided a pneumatic tire having a tread and a bead, a sidewall arranged between the tread and the bead, and a rim protector which is formed at the sidewall and which constitutes an annular protrusion that extends in a tire circumferential direction;

wherein the rim protector has a first protruding edge which extends in the tire circumferential direction and which is toward an exterior in a tire radial direction, a second protruding edge which extends in the tire circumferential direction and which is toward an interior in the tire radial direction, a plurality of recesses arranged in the tire circumferential direction, and a plurality of ridges;

wherein the plurality of ridges respectively connect the first protruding edge and the second protruding edge, and are respectively formed between pairs of the plurality of recesses that are adjacent in the tire circumferential direction;

wherein each of the plurality of ridges comprises a first ridge that extends from the first protruding edge so as to be directed in a first direction in the tire circumferential direction to reach the second protruding edge, and a second ridge that extends from the second protruding edge so as to be directed in the first direction in the tire circumferential direction to reach the first protruding edge; and wherein the first ridges and the second ridges are arranged in alternating fashion along the tire circumferential direction.

In accordance with this constitution, because first ridges and second ridges alternately connect first protruding edges and second protruding edges which extend in the tire circumferential direction, first protruding edges, second protruding edges, first ridges, and second ridges form a truss structure, making it possible to suppress flexing in the tire circumferential direction and to better ensure that there will be sufficient rigidity than is the case when recesses are shaped so as to be formed along the entire circumferential direction. And yet, because there is less rubber due to recesses, heat generation is suppressed, and the increased surface area at recesses also makes it possible to improve heat dissipation characteristics.

DETAILED DESCRIPTION OF THE PREFERRED EMBODIMENTS

Below, a pneumatic tire in an embodiment in accordance with the present disclosure is described with reference to the drawings.

Figure 1:
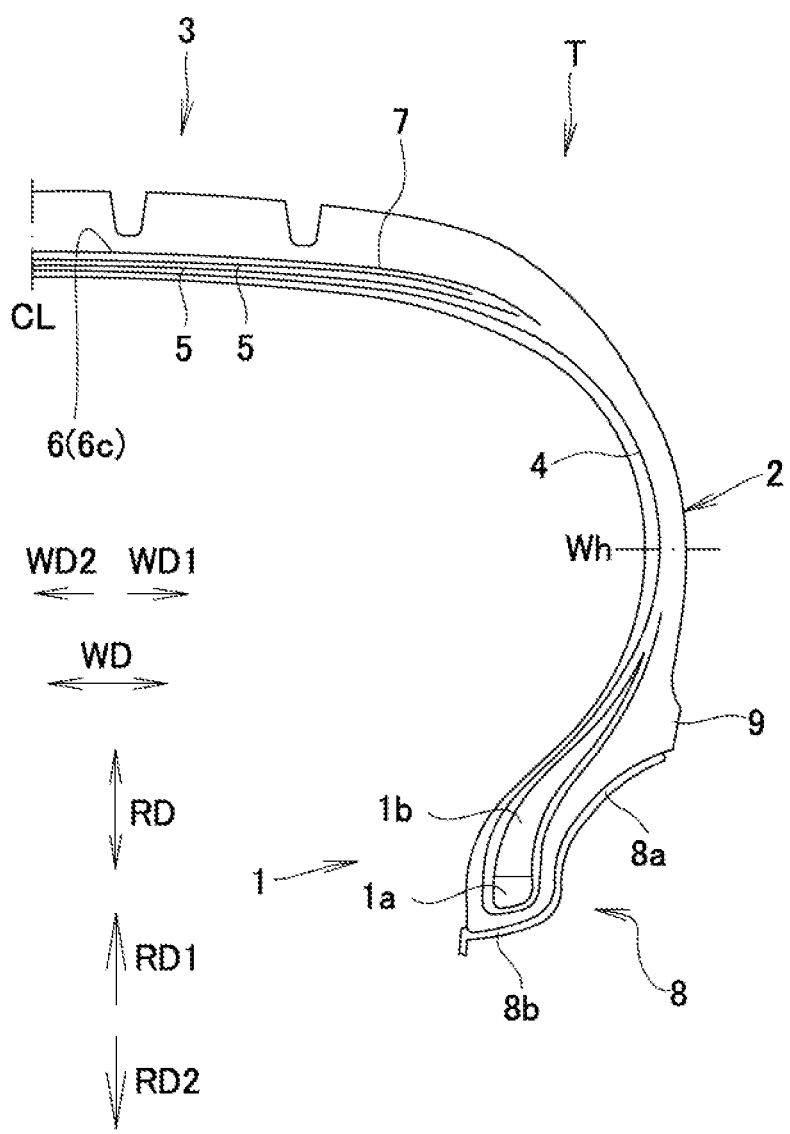
FIG. 1 Drawing of tire meridional half-section showing an example of a pneumatic tire associated with the present disclosure FIG. 2A Magnified view of side view of tire showing rim protector in accordance with FIG. 2B FIG. 2B Side view of tire showing rim protector FIG. 3 Sectional view of section A-A in FIG. 2B and sectional view of die corresponding thereto FIG. 4 Sectional view of section B-B in FIG. 2B and sectional view of die corresponding thereto FIG. 5 Sectional view of section A-A showing a variation FIG. 6 Side view of tire showing rim protector in accordance with a variation FIG. 7 Sectional view of section B-B in accordance with a variation FIG. 8 Side view of tire showing rim protector in accordance with a variation FIG. 9 Sectional view of section C-C in FIG. 8

As shown in FIG. 1, pneumatic tire T is provided with a pair of bead regions 1; sidewall regions 2 which extend toward the exterior RD1 in the tire radial direction from the respective bead regions 1; and tread region 3 which mutually connects the ends toward the exterior RD1 in the tire radial direction of the sidewall regions 2. Arranged at bead region 1 are annular bead core 1a at which steel wire or other such convergent body is coated with rubber, and bead filler 1b which comprises hard rubber. Bead region 1 is mounted on bead sheet 8b of rim 8, and—provided that the air pressure is as it should be (e.g., air pressure as determined by JATMA)—is fitted in appropriate fashion to rim flange 8a by virtue of the tire internal pressure, such that the tire is made to engage with rim 8.

Furthermore, this tire is provided with toroidal carcass layer 4 which is arranged so as to span the distance between the pair of bead regions 1 and which extends from tread region 3 and passes through sidewall regions 2 to reach bead regions 1. Carcass layer 4 is made up of at least one carcass ply, and has end regions that are routed by way of bead cores 1a to be retained in upturned fashion. Arranged toward the inside circumferential surface of carcass layer 4 is inner liner rubber (not shown) for retention of air pressure.

Arranged at the outside circumferential surface of carcass layer 4 at tread region 3 is belt layer 5 which reinforces carcass layer 4 by virtue of the barrel hoop effect. Belt layer 5 has two belt plies that have cords which extend so as to be inclined by prescribed angle(s) with respect to the tire circumferential direction, the respective plies being laminated together in such fashion that the cords thereof intersect in mutually oppositely inclined fashion. Arranged toward the outside circumferential surface of belt layer 5 is belt reinforcing layer 7, and arranged at the outside circumferential surface further in that direction therefrom dis the tread rubber at which the tread pattern is formed.

As examples of rubber raw material for the aforementioned rubber layers and so forth, natural rubber, styrene-butadiene rubber (SBR), butadiene rubber (BR), isoprene rubber (IR), butyl rubber (IIR), and so forth may be cited, it being possible for any one of these to be used alone, or for any two or more of these to be used in combination. Furthermore, such rubber(s) may be reinforced with carbon black, silica, and/or other such filler, and vulcanizing agent, vulcanization accelerator, plasticizer, antioxidant, and/or the like may be blended thereinto as appropriate.

Figure 3:
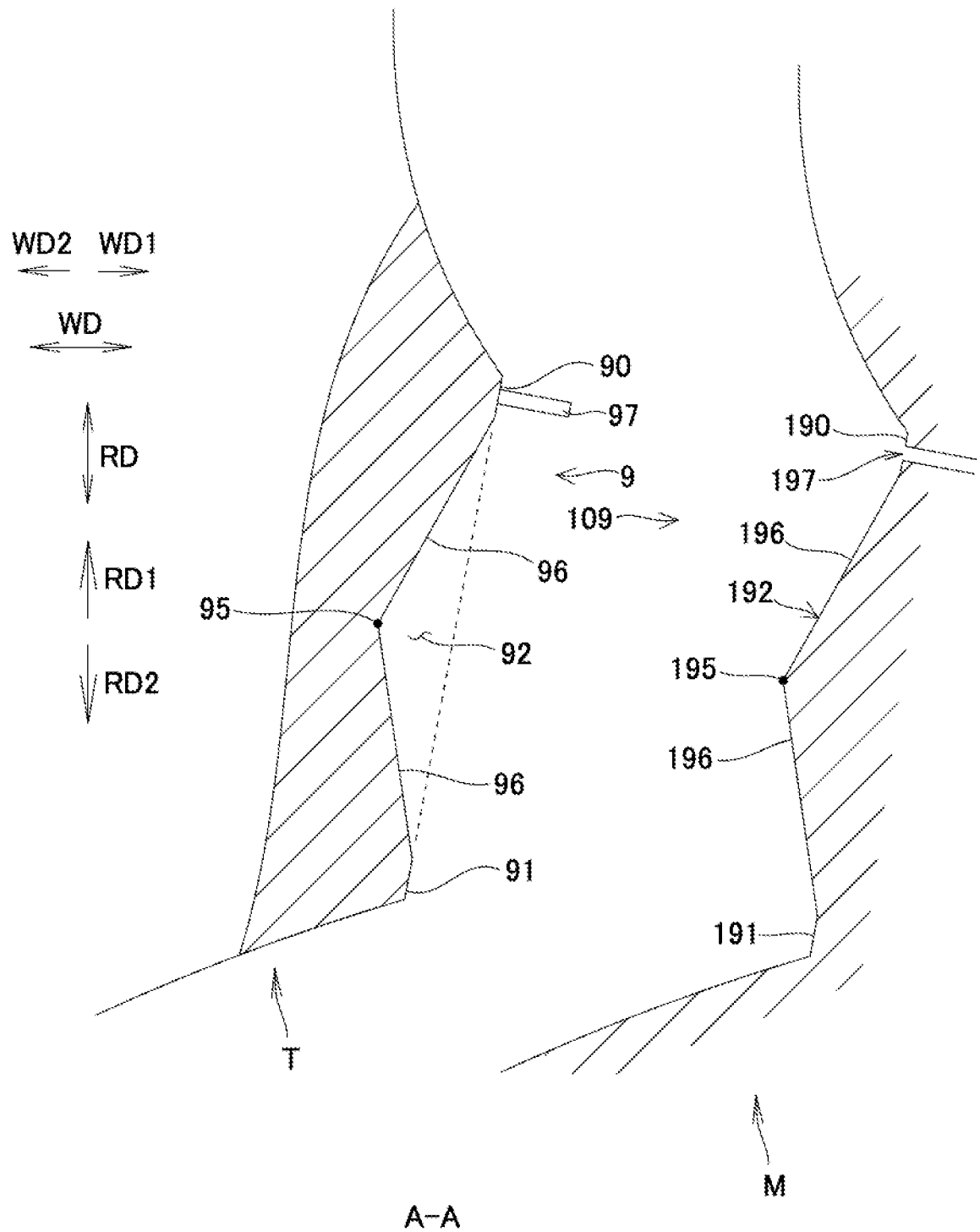
Figure 4:
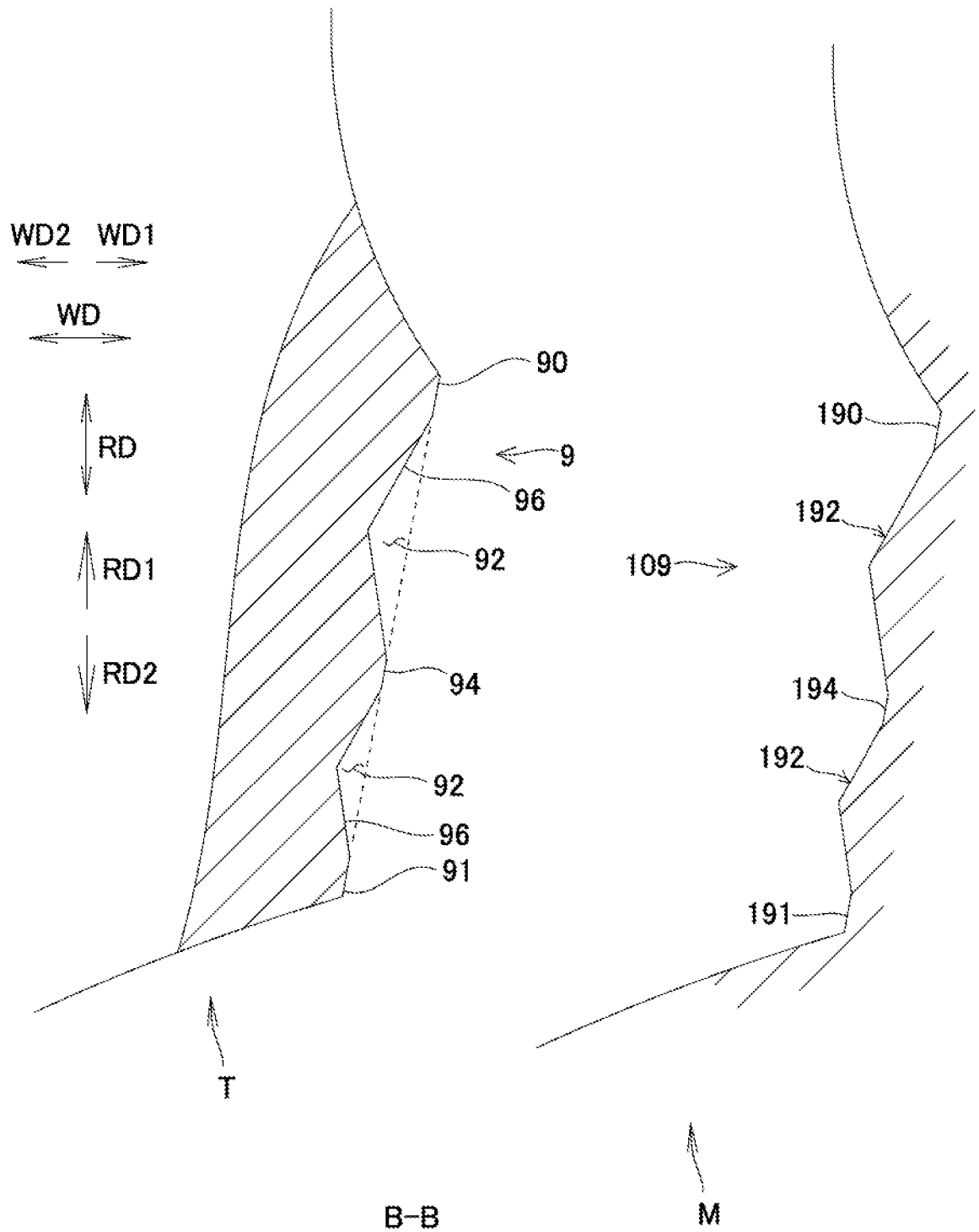
Figure 5:
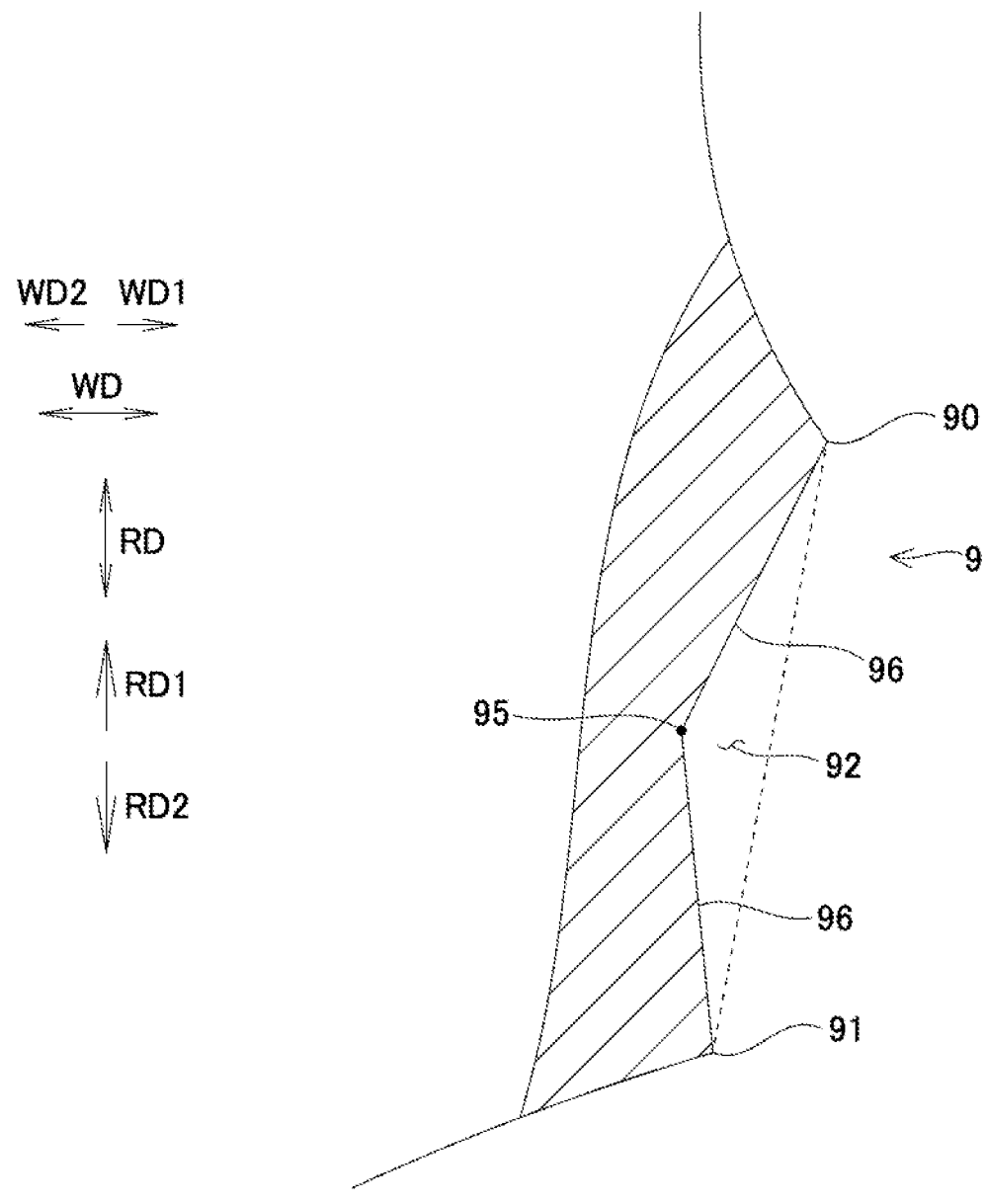

As shown in FIG. 1, in accordance with the present embodiment, rim protector 9 is formed at sidewall region 2. Rim protector 9 is arranged between the portion at which contact is made with rim flange 8*a* and the portion Wh at which tire width is a maximum. As shown in FIG. 1, FIG. 2A and FIG. 2B, rim protector 9 constitutes an annular protrusion that extends in the tire circumferential direction CD. FIG. 3 is a sectional view of section A-A in FIG. 2B. FIG. 4 is a sectional view of section B-B in FIG. 2B. As shown in FIG. 2A, FIG. 2B, FIG. 3, and FIG. 4, the cross-sectional shape of rim protector 9 is trapezoidal as viewed in a tire meridional section. Rim protector 9 has first protruding edge 90 toward the exterior RD1 in the tire radial direction, and second protruding edge 91 toward the interior RD2 in the tire radial direction. First protruding edge 90 and second protruding edge 91 extend in the tire circumferential direction CD so as to be present in the tire circumferential direction everywhere along the circumference thereof. The tip surface of rim protector 9 is partitioned by first protruding edge 90 and second protruding edge 91. A plurality of recesses 92 are arranged in the tire circumferential direction CD at rim protector 9. Note that whereas in the example shown in FIGS. 2A through 4 the apices of first protruding edge 90 and second protruding edge 91 comprise planar surfaces, there is no limitation with respect thereto. For example, as shown in FIG. 5, it may be the case that the apices of first protruding edge 90 and second protruding edge 91 do not comprise planar surfaces but are instead shaped such that linear protrusions are present thereat. It is preferred that the depth of recess 92 not exceed the depth of the tire profile.

As shown in FIG. 2A and FIG. 2B, rim protector 9 has ridges 93, 94 that are formed between two recesses 92 adjacent in the tire circumferential direction CD and that connect first protruding edge 90 and second protruding edge 91. There are two types of ridges 93, 94, these being first ridge(s) 93 which extend from first protruding edge 90 so as to be directed in first direction CD1 in the tire circumferential direction CD to reach second protruding edge 91, and second ridge(s) 94 which extend from second protruding edge 91 so as to be directed in first direction CD1 in the tire circumferential direction CD to reach first protruding edge 90. As shown in same drawing, first ridges 93 and second ridges 94 are arranged in alternating fashion along the tire circumferential direction CD. Thus, because first protruding edges 90, second protruding edges 91, first ridges 93, and second ridges 94 form a truss structure, it is possible to suppress flexing in the tire radial direction and to increase rigidity.

As shown in FIGS. 2A through 4, recess 92 has base 95 toward the interior WD2 in the tire width direction, and inclined surfaces 96 which connect base 95 and first ridge 93, or base 95 and second ridge 94. Because first protruding edges 90 and second protruding edges 91 are also supported by these inclined surfaces 96, increase in rigidity is made possible thereby.

At the example shown in FIGS. 2A through 4, first ridges 93 and second ridges 94 intersect at first protruding edges 90 and second protruding edges 91. Furthermore, base 95 serves as vertex. As shown in same drawings, recess 92 is therefore formed in the shape of a triangular pyramid having base 95 as vertex.

Figure 6:
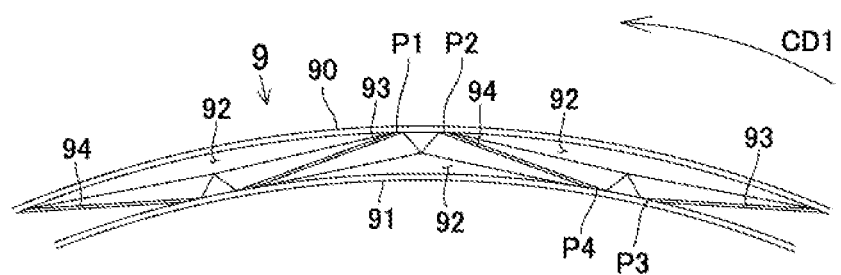

Of course, as shown in FIG. 6, first ridges 93 and second ridges 94 need not intersect at first protruding edges 90 and second protruding edges 91. That is, the point P1 at which first ridge 93 and first protruding edge 90 intersect may be separated from the point P2 at which second ridge 94 and first protruding edge 90 intersect, and the point P3 at which first ridge 93 and second protruding edge 91 intersect may be separated from the point P4 at which second ridge 94 and second protruding edge 91 intersect. Base 95 serves as vertex. At the example shown in FIG. 6, recess 92 is therefore formed in the shape of a quadrangular pyramid having base 95 as vertex.

As shown in the examples at FIGS. 2A through 4 and FIG. 6, if recess 92 has inclined surfaces and if base 95 constitutes a vertex, recess 92 will be in the shape of a triangular pyramid, quadrangular pyramid, or other such polygonal pyramid, facilitating attainment of rigidity due to the inclined surfaces.

At the example shown in FIG. 2A and FIG. 2B, length L1 in the tire circumferential direction CD of recesses 92 is constant. If the size of recesses 92 is constant, then because the spacing with which first ridges 93 and second ridges 94 are arranged will also be constant, it will be possible to ensure that there will be uniform rigidity due to ridges 93, 94. While there is a possibility that to do so would cause occurrence of variation in rigidity in the tire circumferential direction CD, it is of course also possible to adopt a constitution in which length L1 in the tire circumferential direction CD of recesses 92 is not constant.

At the example shown in FIG. 2A and FIG. 2B, one recess 92 lies within an angle θ1 having vertex at tire axis C1 as seen when projected onto a plane perpendicular to tire axis C1. It is preferred that $14° \le \theta1 \le 21°$. Furthermore, as shown in FIG. 2, it is preferred that angle θ2 formed by first ridge 93 and second ridge 94 be such that $140° \le \theta2 \le 160°$. Angle θ2 is large when angle θ1 is large; and conversely, angle θ2 is small when angle θ1 is small. When angles θ1 and θ2 are large, the angles at which first ridge 93 and second ridge 94 are inclined with respect to first protruding edge 90 and second protruding edge 91 will be gentle, making it difficult to ensure that there will be sufficient rigidity. Conversely, if angles θ1 and θ2 are small and angle θ2 is an acute angle, concern with respect to cracking and/or the like could arise.

Figure 7:
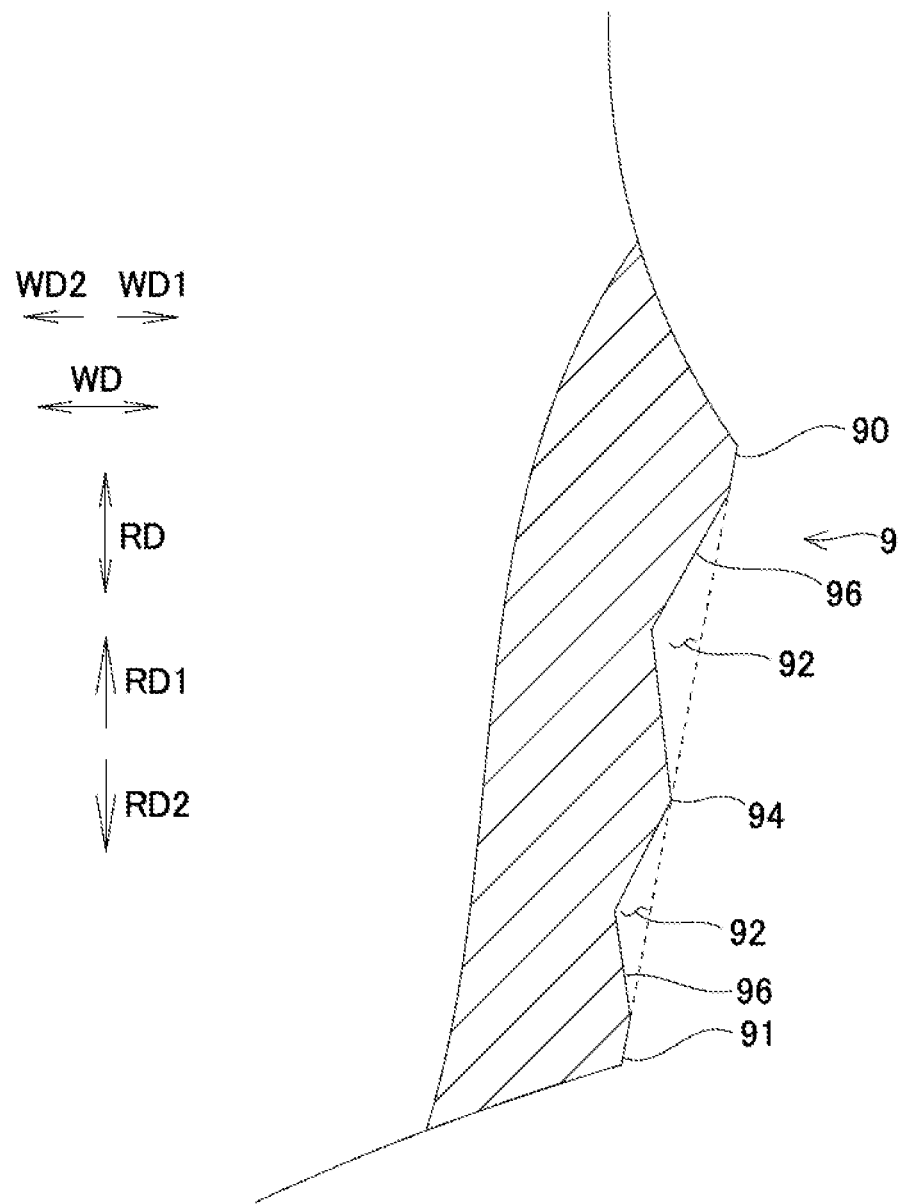

In the example of FIG. 4, the tips of ridges 93, 94 comprise planar surfaces. While exemplary widths of the planar surfaces might be 0.5 mm, there is no limitation with respect thereto. Furthermore, it is possible to adopt the variation shown in FIG. 7. As shown in FIG. 7, the tips of ridges 93, 94 are pointed, there being no planar surfaces thereat. If a constitution is adopted in which the tips of ridges 93, 94 comprise planar surfaces as shown in FIG. 4, rigidity of ridges 93, 94 can be increased more than is the case with a constitution in which as shown in FIG. 7 the tips of ridges 93, 94 are pointed and there are no planar surfaces thereat. In terms of the die, because the tapered recesses are eliminated, there will be less tendency for bare spots and other such mold defects to occur.

Because ridges 93, 94 will be recesses at the tire vulcanizing die, there is a tendency for filling by rubber not to occur, and situations in which bare spots form at which rubber is not present tend to occur. It is therefore preferred that at least one of the intersection of ridges 93, 94 and first protruding edge 90, and the intersection of ridges 93, 94 and second protruding edge 91, be provided with vent hole(s) for release of air. Where this is for a tire, vent sprue 97 will be formed where rubber enters vent hole(s).

Variations

Figure 8:
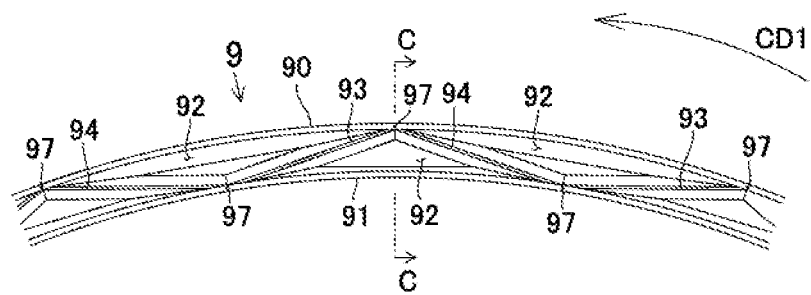
Figure 9:
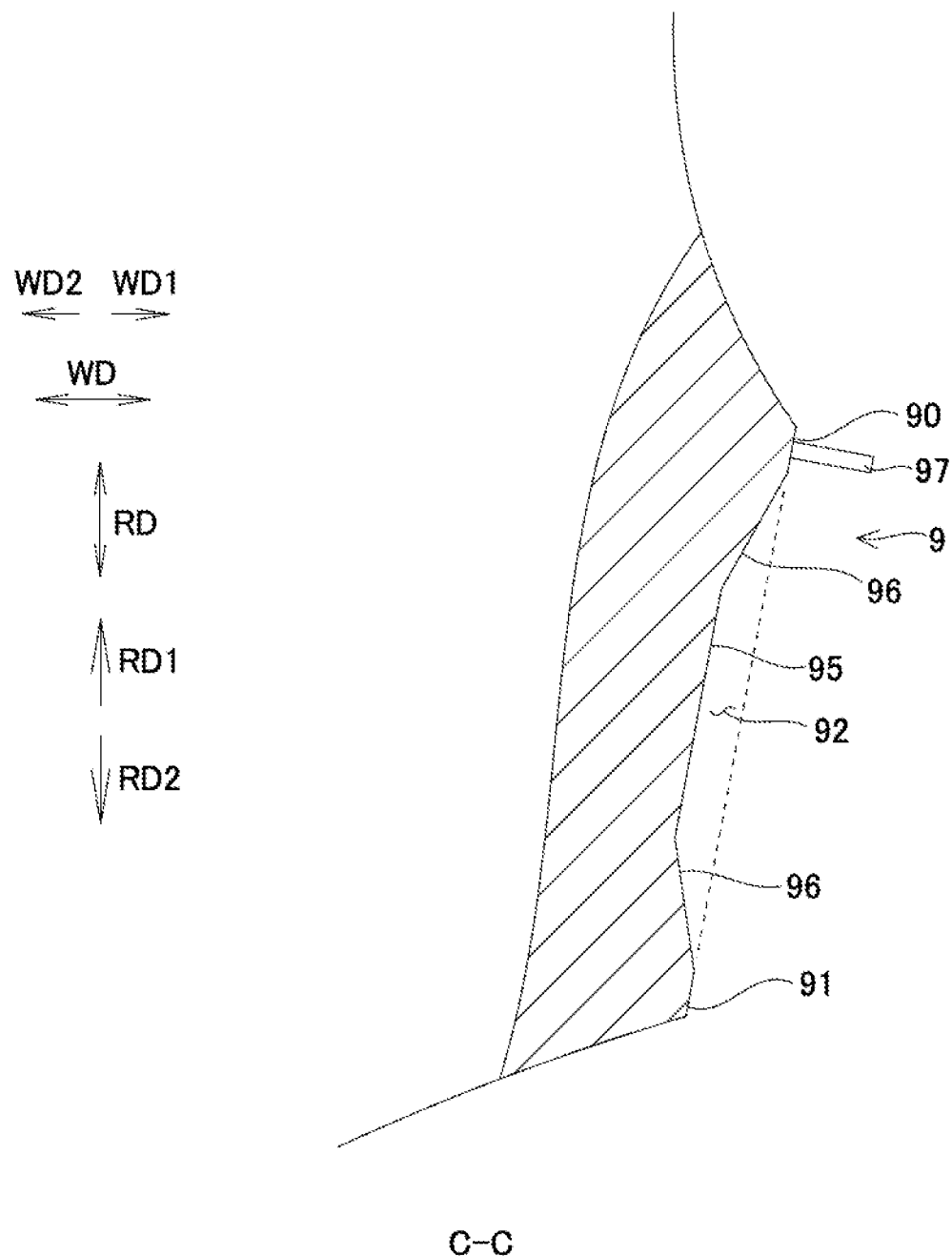
Figure 10:
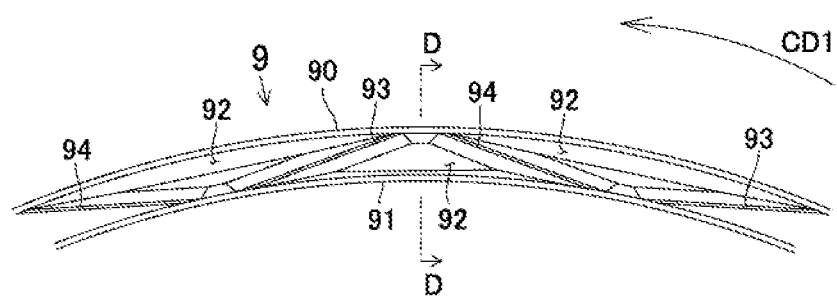
FIG. 10 Side view of tire showing rim protector in accordance with a variation
Figure 11:
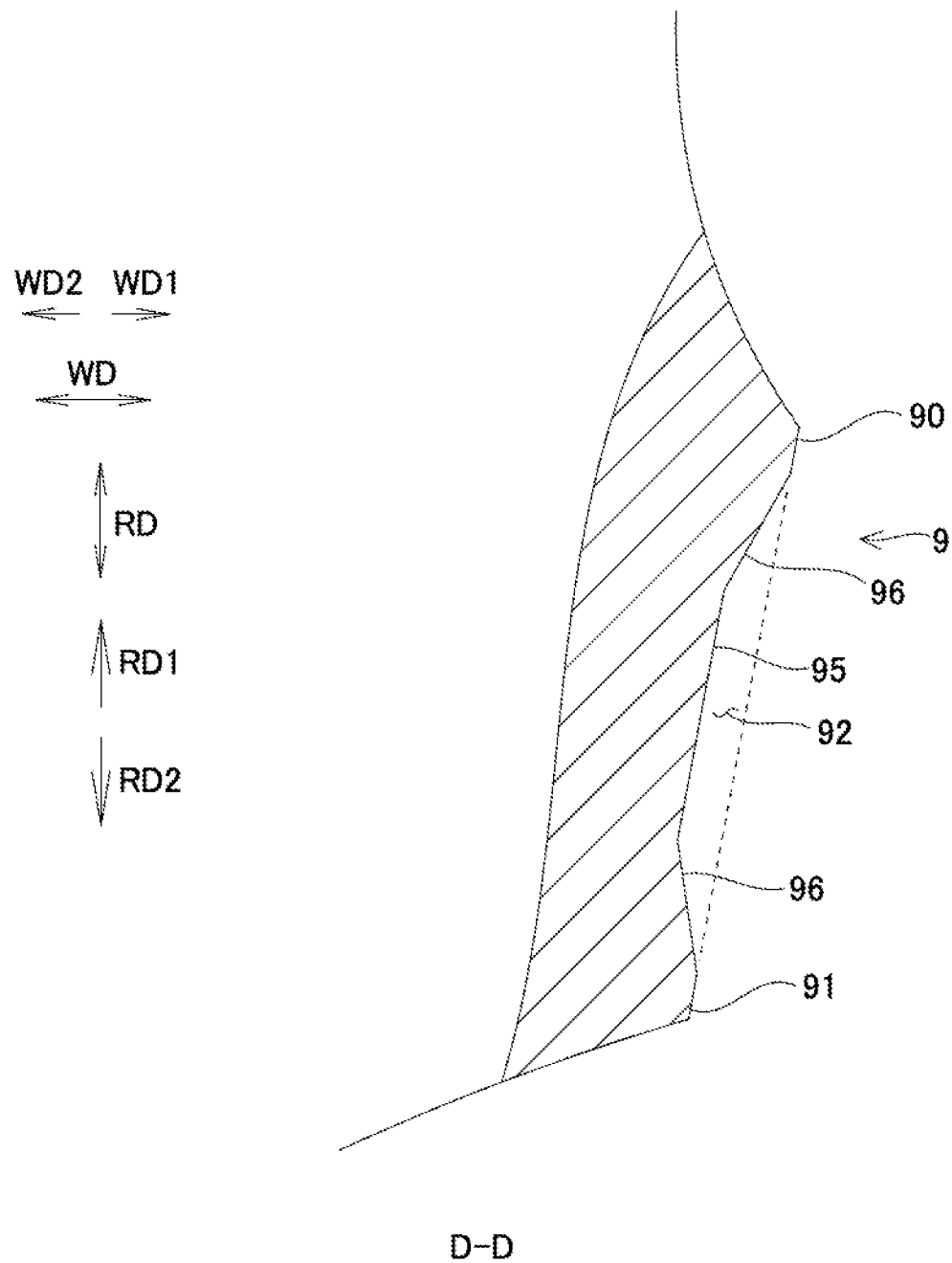
FIG. 11 Sectional view of section D-D in FIG. 10

Whereas bases 95 are vertices in the examples shown in FIGS. 1 through 7, there is no limitation with respect thereto. For example, as shown in FIG. 8, FIG. 9, FIG. 10, and FIG. 11, it is also possible for bases 95 to be planar surfaces. FIG. 8 and FIG. 10 are side views. FIG. 9 is a sectional view of section C-C in FIG. 8. FIG. 11 is a sectional view of section D-D in FIG. 10. If base 95 is a planar surface, then, together with the inclined surfaces, recess 92 will be in the shape of a polygonal prism, as a result of which the surface area of recess 92 can be increased and heat dissipation characteristics can be improved more than is the case when the shape is such that base 95 is a vertex.

Die

Figure 12:
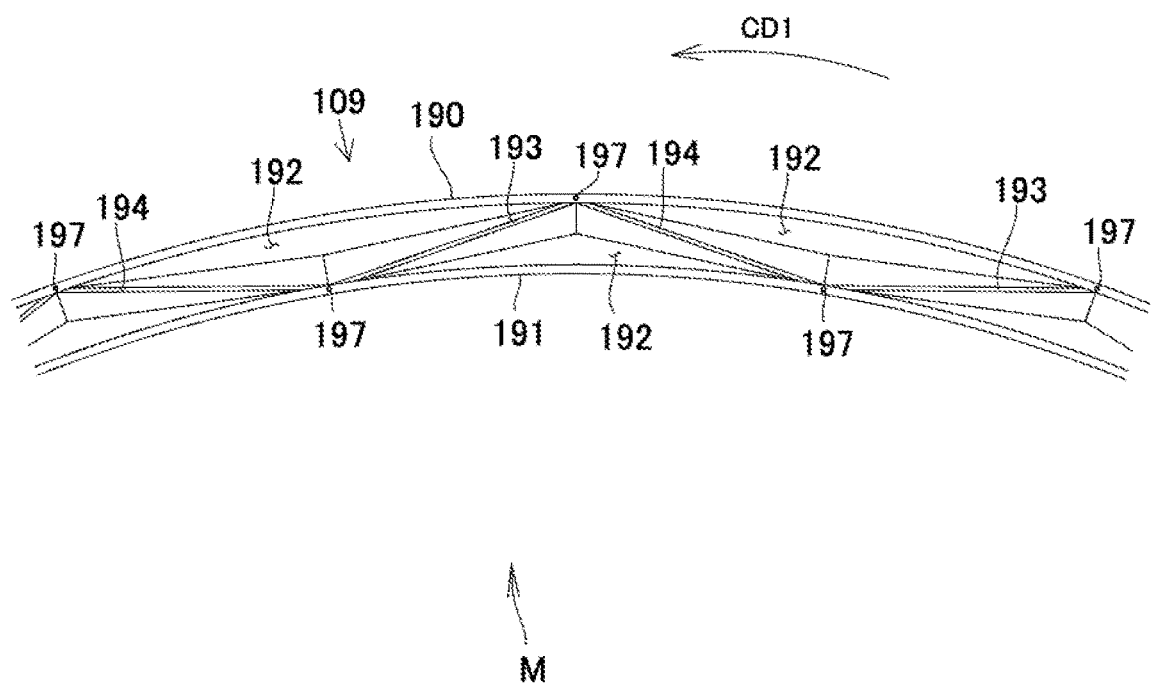
FIG. 12 Drawing showing molding surface at tire vulcanizing die

The present disclosure discloses relates to a tire vulcanizing die M. To form the shape of tire T, die M is formed so as to be in a mirror-like relationship with respect to the recesses and projections on the surface of tire T. As shown in FIG. 12, FIG. 3, and FIG. 4, at location corresponding to sidewall region 2 of the tire, die M has annular protrusion forming recess 109 that forms rim protector 9 which constitutes an annular protrusion that extends in the tire circumferential direction CD. Annular protrusion forming recess 109 has first protruding edge forming recess 190 that forms first protruding edge 90, second protruding edge forming recess 191 that forms second protruding edge 91, recess forming projection 192 that forms recess 92, and ridge forming recesses 193, 194 that form ridges 93, 94. Present at ridge forming recesses 193, 194 are first ridge forming recess 193 that forms first ridge 93, and second ridge forming recess 194 that forms second ridge 94. First ridges 93 formed by first ridge forming recesses 193, and second ridges 94 formed by second ridge forming recesses 194, are arranged in alternating fashion along the tire circumferential direction CD as shown in FIG. 2A and FIG. 2B.

Ridge forming recesses 193, 194 have planar surfaces that form planar surfaces at the tips of ridges 93, 94. As there is a tendency for rubber to enter ridges 93, 94, this makes it possible to suppress bare spots and other such mold defects.

As shown in FIG. 3, vent hole 197 for release of air is formed at at least one of the intersection of ridge forming recesses 193, 194 and first protruding edge forming recess 190, and the intersection of ridge forming recesses 193, 194 and second protruding edge forming recess 191. Vent hole 197 makes it possible to suppress bare spots and other such mold defects.

Recess forming projection 192 has apex 195 that forms base 95 toward the interior WD2 in the tire width direction, and inclined surface forming surfaces 196 that form inclined surfaces 96 which connect base 95 and first ridge 93 or second ridge 94. Recess forming projection 192 is formed in the shape of a polygonal pyramid, the vertex of which is apex 195. In other respects, die M has recesses and projections in correspondence to the shape of tire T.

As described above, a pneumatic tire in accordance with the present embodiment having a tread 3 and a bead 1, a sidewall 2 arranged between the tread 3 and the bead 1, and a rim protector 9 which is formed at the sidewall 2 and which constitutes an annular protrusion that extends in a tire circumferential direction CD. The rim protector 9 has a first protruding edge 90 which extends in the tire circumferential direction CD and which is toward an exterior RD1 in a tire radial direction, a second protruding edge 91 which extends in the tire circumferential direction CD and which is toward an interior RD2 in the tire radial direction, a plurality of recesses 92 arranged in the tire circumferential direction CD, and a plurality of ridges 93, 94. The plurality of ridges 93, 94 respectively connect the first protruding edge 90 and the second protruding edge 91, and are respectively formed between pairs of the plurality of recesses 92 that are adjacent in the tire circumferential direction CD. Each of the plurality of ridges 93, 94 comprises a first ridge 93 that extends from the first protruding edge 90 so as to be directed in a first direction CD1 in the tire circumferential direction CD to reach the second protruding edge 91, and a second ridge 94 that extends from the second protruding edge 91 so as to be directed in the first direction CD1 in the tire circumferential direction CD to reach the first protruding edge 90. The first ridges 93 and the second ridges 94 are arranged in alternating fashion along the tire circumferential direction CD.

In accordance with this constitution, because first ridges 93 and second ridges 94 alternately connect first protruding edges 90 and second protruding edges 91 which extend in the tire circumferential direction CD, first protruding edges 90, second protruding edges 91, first ridges 93, and second ridges 94 form a truss structure, making it possible to suppress flexing in the tire circumferential direction CD and to better ensure that there will be sufficient rigidity than is the case when recesses 92 are shaped so as to be formed along the entire circumferential direction. And yet, because there is less rubber due to recesses 92, heat generation is suppressed, and the increased surface area at recesses 92 also makes it possible to improve heat dissipation characteristics.

As is the case in the present embodiment, it is preferred that at least one of the recesses 92 has a base 95 toward an interior WD2 in a tire width direction, and has an inclined surface 96 which connects the base 95 and at least one of the group consisting of the first ridge 93 and the second ridge 94 of the at least one recess 92.

In accordance with this constitution, because the inclined surfaces serve as support, it will be possible to ensure that there will be sufficient rigidity. Note that recess(es) may be constituted from base(s) comprising planar surface(s) and from horizontal wall(s) perpendicular to depth direction(s).

As is the case in the embodiment shown in FIG. 2A to FIG. 7, it is preferred that the at least one recess 92 is in a shape of a polygonal pyramid of which the base 95 is a vertex.

In accordance with this constitution, because recesses 92 are mostly formed with inclined surfaces 96, attainment of rigidity is facilitated due to the inclined surfaces.

As is the case in the embodiment shown in FIG. 8 to FIG. 11, it is preferred that the at least one recess 92 is in a shape of a polygonal prism of which the base 95 is a planar surface.

In accordance with this constitution, surface area can be increased and heat dissipation characteristics can be improved more than is the case when the shape is such that base 95 is a vertex.

As is the case in the embodiment shown in FIG. 2A and FIG. 2B, it is preferred that length L1 in the tire circumferential direction CD of the recesses 92 is constant.

Where there is variation in length L1 in the tire circumferential direction CD of recesses 92, this will cause occurrence of variation in rigidity in the tire circumferential direction CD. But by causing recesses 92 to be uniform size or approximately uniform size everywhere along the entire circumference of the tire, it will be possible to ensure that there will be uniform rigidity.

As is the case in the embodiment shown in FIG. 2A and FIG. 2B, it is preferred that the recesses 92 are of such sizes as to respectively lie within angles θ1 not less than 14° but not greater than 21° and having vertices at a tire axis C1 as seen when projected onto a plane perpendicular to the tire axis C1.

When angle θ1 is small, angle θ2 formed by first ridge 93 and second ridge 94 will be an acute angle and there will be concern with respect to cracking and/or the like; conversely, when angle θ1 is large, ridges 93 and 94 will be inclined in gentle fashion with respect to first protruding edge 90 and second protruding edge 91, making it difficult to ensure that there will be sufficient rigidity.

As is the case in the embodiment shown in FIG. 2A or FIG. 8, it is preferred that the first ridges 93 and the second ridges 94 intersect at the first protruding edge 90 and the second protruding edge 91.

In accordance with this constitution, rigidity can be increased more than is the case when shape is such that first ridge 93 and second ridge 94 do not intersect but are separated.

As is the case in the embodiment shown in FIG. 1 to FIG. 6 or FIG. 8 to FIG. 11, it is preferred that tips of the ridges 93, 94 comprise planar surfaces.

This constitution will make it possible to increase the rigidity of ridges 93, 94. Furthermore, with respect to the die, as there is a tendency for rubber to enter ridges 93, 94, this makes it possible to suppress bare spots and other such mold defects.

As is the case in the embodiment shown in FIG. 2A or FIG. 8, it is preferred that vent sprue 97 is formed at at least one of an intersection of at least one of the ridges 93, 94 and the first protruding edge 90, and an intersection of at least one of the ridges 93, 94 and the second protruding edge 91.

This constitution will make it possible to suppress bare spots and other such mold defects.

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

The invention claimed is:

1. A pneumatic tire having a tread and a pair of beads, a pair of sidewalls each arranged between the tread and the respective one of the pair of beads, and a rim protector which is formed at one of the sidewalls and which constitutes an annular protrusion that extends in a tire circumferential direction;
    wherein the rim protector has a first protruding edge which continuously extends in the tire circumferential direction and which is outermost in a tire radial direction, a second protruding edge which continuously extends in the tire circumferential direction and which is innermost in the tire radial direction, an axially outer tip surface extending from the first protruding edge to the second protruding edge, a plurality of recesses arranged in the tire circumferential direction, and a plurality of ridges;
    wherein the plurality of ridges respectively connect the first protruding edge and the second protruding edge, and are respectively formed between pairs of the plurality of recesses that are adjacent in the tire circumferential direction;
    wherein each of the plurality of ridges comprises a first ridge that extends from the first protruding edge so as to be directed in a first direction in the tire circumferential direction to reach the second protruding edge, and a second ridge that extends from the second protruding edge so as to be directed in the first direction in the tire circumferential direction to reach the first protruding edge; and
    wherein the first ridges and the second ridges are arranged in alternating fashion along the tire circumferential direction.

2. The pneumatic tire according to claim 1 wherein at least one of the recesses has a base toward an interior in a tire width direction, and has an inclined surface which connects the base and at least one of the group consisting of the first ridge and the second ridge of the at least one recess.

3. The pneumatic tire according to claim 2 wherein the at least one recess is in a shape of a polygonal pyramid of which the base is a vertex.

4. The pneumatic tire according to claim 2 wherein the at least one recess is in a shape of a polygonal prism of which the base is a planar surface.

5. The pneumatic tire according to claim 1 wherein maximum length in the tire circumferential direction of the recesses is constant.

6. The pneumatic tire according to claim 1 wherein the recesses are of such sizes as to respectively lie within angles not less than 14° but not greater than 21° and having vertices at a tire axis as seen when projected onto a plane perpendicular to the tire axis.

7. The pneumatic tire according to claim 1 wherein the first ridges and the second ridges intersect at the first protruding edge and the second protruding edge.

8. The pneumatic tire according to claim 1 wherein the tips of the ridges comprise planar surfaces.

9. The pneumatic tire according to claim 1 wherein vent sprue is formed at least one of an intersection of at least one of the ridges and the first protruding edge, and an intersection of at least one of the ridges and the second protruding edge.

* * * * *